US008370140B2

(12) United States Patent
Vitte et al.

(10) Patent No.: US 8,370,140 B2

(45) Date of Patent: Feb. 5, 2013

(54) METHOD OF FILTERING NON-STEADY LATERAL NOISE FOR A MULTI-MICROPHONE AUDIO DEVICE, IN PARTICULAR A "HANDS-FREE" TELEPHONE DEVICE FOR A MOTOR VEHICLE

(75) Inventors: Guillaume Vitte, Paris (FR); Julie Seris, Paris (FR); Guillaume Pinto, Paris (FR)

(73) Assignee: Parrot, Paris (FR)

( * ) Notice: Subject to any disclaimer, the term of this patent is extended or adjusted under 35 U.S.C. 154(b) by 232 days.

(21) Appl. No.: 12/829,115

(22) Filed: Jul. 1, 2010

(65) Prior Publication Data

US 2011/0054891 A1 Mar. 3, 2011

(30) Foreign Application Priority Data

Jul. 23, 2009 (FR) ..................................... 09 55133

(51) Int. Cl.
*G10L 15/20* (2006.01)
*G10L 15/00* (2006.01)
*H04M 1/00* (2006.01)
*H04M 9/00* (2006.01)

(52) U.S. Cl. .................... 704/233; 704/231; 379/388.06

(58) Field of Classification Search ........................ None
See application file for complete search history.

(56) References Cited

U.S. PATENT DOCUMENTS 5,539,859 A * 7/1996 Robbe et al. .................. 704/233
5,752,226 A * 5/1998 Chan et al. .................... 704/233
5,812,970 A * 9/1998 Chan et al. .................... 704/226
6,130,949 A * 10/2000 Aoki et al. ................... 381/94.3
6,167,375 A * 12/2000 Miseki et al. ................. 704/229
6,192,134 B1 * 2/2001 White et al. .................... 381/92

(Continued)

FOREIGN PATENT DOCUMENTS

EP 1473964 A2 11/2004
EP 1473964 A3 8/2006

(Continued)

OTHER PUBLICATIONS

Alexandre Guérin, Régine Le Bouquin-Jeannés, Gérard Faucon, "A Two-Sensor Noise Reduction System: Applications for Hands-Free Car Kit", EURASIP Journal on Applied Signal Processing (2003).*

(Continued)

*Primary Examiner* — David R Hudspeth
*Assistant Examiner* — Timothy Nguyen
(74) *Attorney, Agent, or Firm* — Haverstock & Owens LLP

(57) ABSTRACT

A multi-microphone hands-free device operating in noisy surroundings implements a method of de-noising a noisy sound signal. The noisy sound signal comprises a useful speech component coming from a directional speech source and an unwanted noise component, the noise component itself including a lateral noise component that is non-steady and directional. The method operates in the frequency domain and comprises combining signals into a noisy combined signal,
estimating a pseudo-steady noise component,
calculating a probability of transients being present in the noisy combined signal,
estimating a main arrival direction of transients,
calculating a probability of speech being present on the basis of a three-dimensional spatial criterion suitable for discriminating amongst the transients between useful speech and lateral noise, and
selectively reducing noise by applying a variable gain specific to each frequency band and to each time frame.

9 Claims, 1 Drawing Sheet

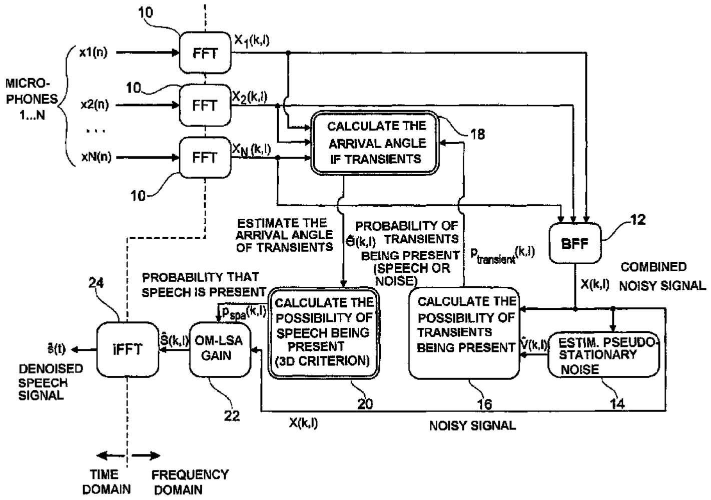

U.S. PATENT DOCUMENTS

| | | | | |
|---|---|---|---|---|
| 6,230,123 | B1 * | 5/2001 | Mekuria et al. | 704/226 |
| 6,243,322 | B1 * | 6/2001 | Zakarauskas | 367/127 |
| 6,289,309 | B1 * | 9/2001 | deVries | 704/233 |
| 6,339,758 | B1 * | 1/2002 | Kanazawa et al. | 704/226 |
| 6,453,285 | B1 * | 9/2002 | Anderson et al. | 704/210 |
| 6,535,666 | B1 * | 3/2003 | Dogan et al. | 385/31 |
| 6,707,910 | B1 * | 3/2004 | Valve et al. | 379/388.06 |
| 6,748,088 | B1 * | 6/2004 | Schaaf | 381/92 |
| 6,910,011 | B1 * | 6/2005 | Zakarauskas | 704/233 |
| 6,937,980 | B2 * | 8/2005 | Krasny et al. | 704/231 |
| 6,959,276 | B2 * | 10/2005 | Droppo et al. | 704/226 |
| 7,062,049 | B1 * | 6/2006 | Inoue et al. | 381/71.4 |
| 7,072,831 | B1 * | 7/2006 | Etter | 704/226 |
| 7,072,833 | B2 * | 7/2006 | Rajan | 704/233 |
| 7,084,801 | B2 * | 8/2006 | Balan et al. | 341/155 |
| 7,117,145 | B1 * | 10/2006 | Venkatesh et al. | 704/200 |
| 7,117,149 | B1 * | 10/2006 | Zakarauskas | 704/233 |
| 7,231,347 | B2 * | 6/2007 | Zakarauskas | 704/233 |
| 7,327,852 | B2 * | 2/2008 | Ruwisch | 381/356 |
| 7,395,211 | B2 * | 7/2008 | Watson et al. | 704/500 |
| 7,533,015 | B2 * | 5/2009 | Takiguchi et al. | 704/205 |
| 7,567,678 | B2 * | 7/2009 | Kong et al. | 381/92 |
| 7,720,679 | B2 * | 5/2010 | Ichikawa et al. | 704/233 |
| 7,725,315 | B2 * | 5/2010 | Hetherington et al. | 704/233 |
| 7,953,596 | B2 * | 5/2011 | Pinto | 704/233 |
| 7,970,609 | B2 * | 6/2011 | Hayakawa | 704/238 |
| 8,005,237 | B2 * | 8/2011 | Tashev et al. | 381/92 |
| 8,073,157 | B2 * | 12/2011 | Mao et al. | 381/92 |
| 8,073,689 | B2 * | 12/2011 | Hetherington et al. | 704/233 |
| 8,081,772 | B2 * | 12/2011 | Turnbull et al. | 381/86 |
| 8,098,842 | B2 * | 1/2012 | Florencio et al. | 381/92 |
| 8,139,787 | B2 * | 3/2012 | Haykin et al. | 381/94.1 |
| 8,140,327 | B2 * | 3/2012 | Kennewick et al. | 704/226 |
| 8,150,682 | B2 * | 4/2012 | Nongpiur et al. | 704/207 |
| 8,189,807 | B2 * | 5/2012 | Cutler | 381/92 |
| 2002/0176589 | A1 * | 11/2002 | Buck et al. | 381/94.7 |
| 2003/0040908 | A1 * | 2/2003 | Yang et al. | 704/233 |
| 2003/0147538 | A1 * | 8/2003 | Elko | 381/92 |
| 2004/0138882 | A1 * | 7/2004 | Miyazawa | 704/233 |
| 2005/0114128 | A1 * | 5/2005 | Hetherington et al. | 704/233 |
| 2007/0230712 | A1 * | 10/2007 | Belt et al. | 381/71.1 |
| 2007/0276660 | A1 * | 11/2007 | Pinto | 704/219 |
| 2008/0086309 | A1 * | 4/2008 | Fischer et al. | 704/271 |
| 2009/0164212 | A1 * | 6/2009 | Chan et al. | 704/226 |
| 2009/0310796 | A1 * | 12/2009 | Seydoux | 381/71.1 |
| 2010/0017206 | A1 * | 1/2010 | Kim et al. | 704/233 |
| 2010/0082340 | A1 * | 4/2010 | Nakadai et al. | 704/233 |
| 2011/0015924 | A1 * | 1/2011 | Gunel Hacihabiboglu et al. | 704/231 |
| 2011/0054891 | A1 * | 3/2011 | Vitte et al. | 704/233 |
| 2011/0070926 | A1 * | 3/2011 | Vitte et al. | 455/569.2 |
| 2011/0305345 | A1 * | 12/2011 | Bouchard et al. | 381/23.1 |

FOREIGN PATENT DOCUMENTS

| | | | |
|---|---|---|---|
| WO | 0232356 | A1 | 4/2002 |

OTHER PUBLICATIONS

Min-Seok Choia and Hong-Goo Kangb, "A Two-Channel Minimum Mean-Square Error Log-Spectral Amplitude Estimator for Speech Enhancement"—(2008) IEEE.*

Y. Ephraim and D. Malah, "Speech enhancement using a minimum mean-square error Log-spectral amplitude estimator," IEEE Trans. Acoustics, Speech and Signal Processing, vol. ASSP-33, No. 2, pp. 443-445, Apr. 1985.*

I. Cohen and B. Berdugo "Speech enhancement for non-stationarynoise environments", 2001, Signal Processing 81 (2001) pp. 2403-2418.*

Cohen, Israel,"Analysis of Two-Channel Generalized Sidelobe Canceller (GSC) With Post-Filtering", IEE Transactions on Speech and Audio Processing, vol. II, No. 6, Nov. 1, 2003, pp. 684-699.

* cited by examiner

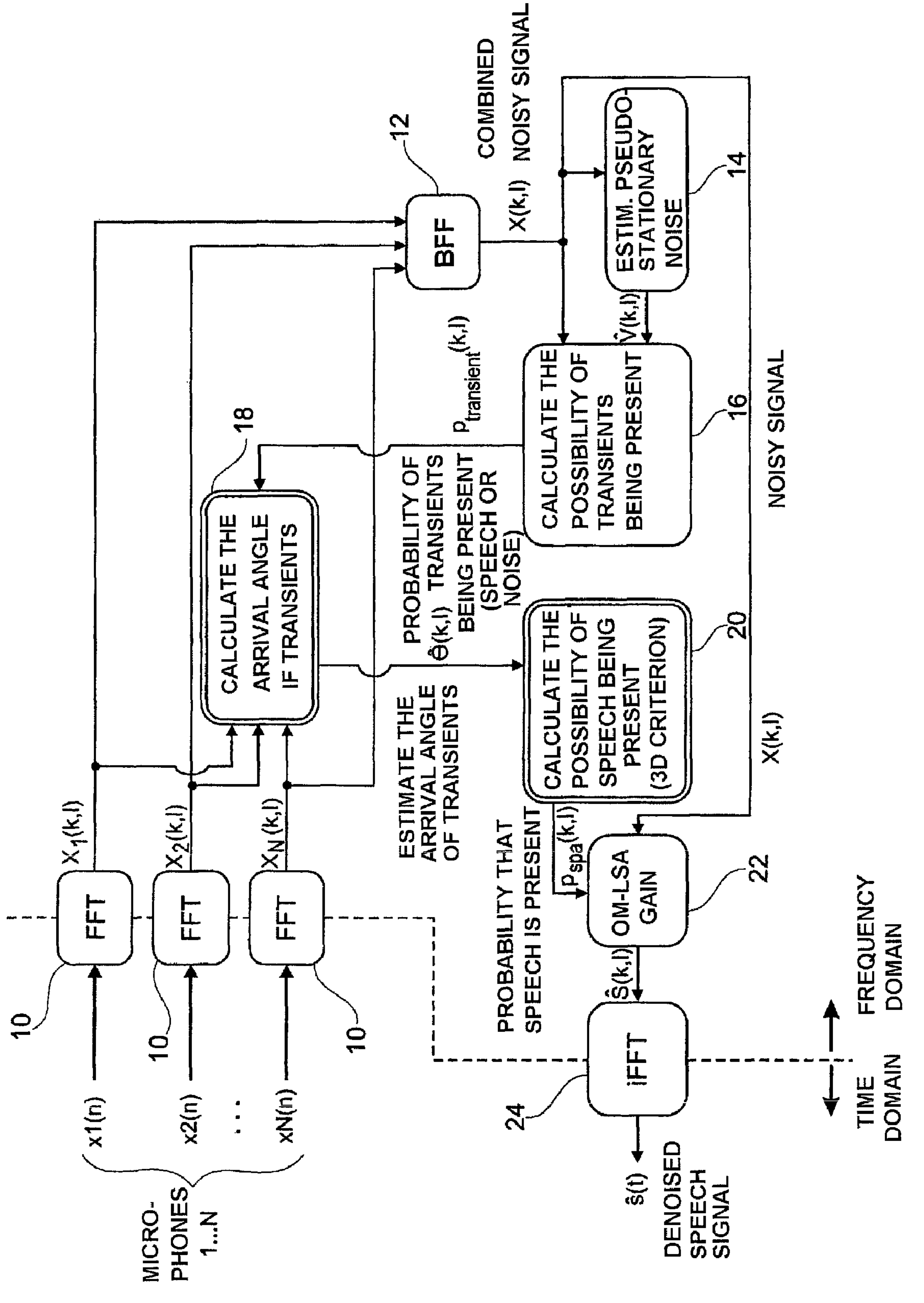
MICRO-PHONES 1...N
x1(n)
x2(n)
. . .
xN(n)
10
10
10
FFT
FFT
FFT
X1(k,l)
X2(k,l)
XN(k,l)
BFF
12
X(k,l)
COMBINED NOISY SIGNAL
ESTIM. PSEUDO-STATIONARY NOISE
14
V̂(k,l)
CALCULATE THE POSSIBILITY OF TRANSIENTS BEING PRESENT
16
p transient(k,l)
PROBABILITY OF TRANSIENTS BEING PRESENT (SPEECH OR NOISE)
CALCULATE THE ARRIVAL ANGLE IF TRANSIENTS
18
θ̂(k,l)
ESTIMATE THE ARRIVAL ANGLE OF TRANSIENTS
CALCULATE THE POSSIBILITY OF SPEECH BEING PRESENT (3D CRITERION)
20
NOISY SIGNAL
X(k,l)
p spa(k,l)
PROBABILITY THAT SPEECH IS PRESENT
OM-LSA GAIN
22
Ŝ(k,l)
iFFT
24
ŝ(t)
DENOISED SPEECH SIGNAL
TIME DOMAIN
FREQUENCY DOMAIN

METHOD OF FILTERING NON-STEADY LATERAL NOISE FOR A MULTI-MICROPHONE AUDIO DEVICE, IN PARTICULAR A "HANDS-FREE" TELEPHONE DEVICE FOR A MOTOR VEHICLE

FIELD OF THE INVENTION

The invention relates to processing speech in noisy surroundings.

The invention relates particularly, but in non-limiting manner, to processing speech signals picked up by telephone devices for motor vehicles.

BACKGROUND OF THE INVENTION

Such appliances include a sensitive microphone that picks up not only the user's voice, but also the surrounding noise, which noise constitutes a disturbing element that, under certain circumstances, can go so far as to make the speaker's speech incomprehensible. The same applies if it is desired to perform shape recognition voice recognition techniques, since it is difficult to recognize shape for words that are buried in a high level of noise.

This difficulty, which is associated with surrounding noise, is particularly constraining with "hands-free" devices. In particular, the large distance between the microphone and the speaker gives rise to a relatively high level of noise that makes it difficult to extract the useful signal buried in the noise.

Furthermore, the very noisy surroundings typical of the motor car environment present spectral characteristics that are not steady, i.e. that vary in unforeseeable manner as a function of driving conditions: driving over deformed surfaces or cobblestones, car radio in operation, etc.

Some such devices provide for using a plurality of microphones, generally two microphones, and they obtain a signal with a lower level of disturbances by taking the average of the signals that are picked up, or by performing other operations that are more complex. In particular, a so-called "beamforming" technique enables software means to establish directionality that improves the signal-to-noise ratio, however the performance of that technique is very limited when only two microphones are used.

Furthermore, conventional techniques are adapted above all to filtering noise that is diffuse and steady, coming from around the device and occurring at comparable levels in the signals that are picked up by both of the microphones.

In contrast, noise that is not steady, i.e. that noise varies in unforeseeable manner as a function of time, is not distinguished from speech and is therefore not attenuated.

Unfortunately, in a motor car environment, such non-steady noise that is directional occurs very frequently: a horn blowing, a scooter going past, a car overtaking, etc.

One of the difficulties in filtering such non-steady noise stems from the fact that it presents characteristics in time and in three-dimensional space that are very close to the characteristics of speech, thus making it difficult firstly to estimate whether speech is present (given that the speaker does not speak all the time), and secondly to extract the useful speech signal from a very noisy environment such as a motor vehicle cabin.

OBJECT AND SUMMARY OF THE INVENTION

One of the objects of the invention is to take advantage of the multi-microphone structure of the device in order to detect such non-steady noise in a three-dimensional spatial manner, and then to distinguish amongst all of the non-steady components (also referred to as "transients"), those that are non-steady noise components and those that are speech components, and finally to process the signal as picked up in order to de-noise it in effective manner while minimizing the distortions introduced by the processing.

Below, the term "lateral noise" is used to designate directional non-steady noise having an arrival direction that is spaced apart from the arrival direction of the useful signal, and the term "privileged cone" is used to designate the direction or angular sector in three-dimensional space in which the source of the useful signal (speaker's speech) is located relative to the array of microphones. When a sound source is detected as lying outside the privileged cone, that sound is therefore lateral noise, and it is to be attenuated.

The starting point of the invention consists in associating the non-steady properties in time and frequency with directionality in three-dimensional space in order to detect a type of noise that is otherwise difficult to distinguish from speech, and then to deduce therefore a probability that speech is present, which probability is used in attenuating the noise.

More precisely, the invention provides a method of de-noising a noisy sound signal picked up by a plurality of microphones of a multi-microphone audio device that is operating in noisy surroundings. The noisy sound signal comprises a useful speech component coming from a directional speech source and an unwanted noise component, the noise component itself including a lateral noise component that is non-steady and directional.

By way of example, one such method is disclosed by: I. Cohen, *Analysis of two-channel generalized sidelobe canceller (GSC) with post-filtering*, IEEE Transactions on Speech and Audio Processing, Vol. 11, No. 6, November 2003, pp. 684-699.

Essentially, and in a manner characteristic of the invention, the method comprises the following processing steps that are performed in the frequency domain:

a) combining a plurality of signals picked up by the corresponding plurality of microphones to form a noisy combined signal;

b) from the noisy combined signal, estimating a pseudo-steady noise component contained in said noisy combined signal;

c) from the pseudo-steady noise component estimated in step b) and from the noisy combined signal, calculating a probability of transients being present in the noisy combined signal;

d) from the plurality of signals picked up by the corresponding plurality of microphones and from the probability of transients being present as calculated in step c), estimating a main arrival direction of transients;

e) from the main arrival direction of transients as estimated in step d), calculating a probability of speech being present on the basis of a three-dimensional spatial criterion suitable for distinguished amongst the transients between useful speech and lateral noise; and f) from the probability of speech being present as calculated in step e), and from the noisy combined signal, selectively reducing noise by applying variable gain specific to each frequency band and to each time frame.

According to various advantageous subsidiary implementations:

- the processing in step a) is prefiltering processing of the fixed beamforming type;
- the processing of step e) comprises the following successive substeps: d1) partitioning three-dimensional space into a plurality of angular sectors; d2) for each sector, evaluating an arrival direction estimator from the plurality of signals picked up by the corresponding plurality of microphones; d3) weighting each estimator by the probability of the presence of transients as calculated in step c); d4) from the weighted estimator values calculated in step d3), estimating a main arrival direction of transients; and d5) confirming or infirming the estimated main arrival direction of transients performed in step d4);

in step d5) the estimate is confirmed only if the value of the weighted estimate corresponding to the estimated direction is greater than a predetermined threshold, and/or in the absence of a local maximum of the weighted estimator in the angular sector from which the useful speech signal originates, and/or if the value of the estimator is increasing monotonically over a plurality of successive time frames;

the method also includes a step of maintaining the estimate of the main arrival direction over a minimum predetermined lapse of time;

the probability of speech being present, as calculated in step e) is either a probability that is binary, taking a value of 1 or of 0 depending on whether the main arrival direction of transients as estimated in step d) is or is not situated in the angular sector from which the useful speech signal originates, or a probability that has multiple values that are a function of the angular difference between the main arrival direction of transients as estimated in step d) and the direction from which the useful speech signal originates; and the processing of step f) is selective noise reduction processing by applying gain of optimized modified log-spectral amplitude (OM-LSA).

BRIEF DESCRIPTION OF THE DRAWING

There follows a description of an implementation of the method of the invention with reference to the accompanying FIGURE.

FIG. 1 is a block diagram shown the various modules and functions implemented by the method of the invention and how they interact.

MORE DETAILED DESCRIPTION

The method of the invention is implemented by software means that can be broken down schematically as a certain'number of modules 10 to 24 as shown in FIG. 1.

The processing is implemented in the form of appropriate algorithms executed by a microcontroller or by a digital signal processor. Although for clarity of description the various processes are shown as being in the form of distinct modules, they implement elements that are common and that correspond in practice to a plurality of functions performed overall by the same software.

The signal that is to be de-noised comes from a plurality of signals picked up by an array of microphones (which in a minimum configuration may comprise an array of only two microphones) arranged in a predetermined configuration.

The array of microphones picks up the signal emitted by the useful signal source (speech signal), and the differences of position between the microphones give rise to a set of phase shifts and variations in amplitude in the recordings of the signals as emitted by the useful signal source.

More precisely, the microphone of index n delivers a signal:

$$x_n(t)=a_n \times s(t-\tau_n)+v_n(t)$$

where $a_n$ is the amplitude attenuation due to the loss of energy between the position of the sound source s and the microphone, $\tau_n$ is the phase shift between the emitted signal and the signal received by the microphone, and $v_n$ represents the value of the diffuse noise field at the position of the microphone.

Insofar as the source is spaced apart from the microphone by at least a few centimeters, it is possible to make the approximation that the sound source emits a plane wave. The delays $\tau_n$ can then be calculated from the angle $\theta_s$ defined as the angle between the right bisectors between microphone pairs (n, m) and the reference direction corresponding to the source s of the useful signal. When the system under consideration has two microphones with a right bisector that intersects the source, then the angle $\theta_s$ is zero.

Fourier Transform of the Signals Picked Up by the Microphones (Blocks 10)

The signal in the time domain $x_n(t)$ from each of the N microphones is digitized, cut up into frames of T time points, time windowed by a Hanning type window, and then the fast Fourier transform FFT (short-term transform) $X_n(k,l)$ is calculated for each of these signals:

$$X_n(k,l)=a_n \cdot d_n(k) \times S(k,l)+V_n(k,l)$$

with:

$$d_n(k)=e^{-i2\pi f_k \tau_n}$$

l being the index of the time frame;

k being the index of the frequency band; and $f_k$ being the center frequency of the frequency band of index k.

Building a Partially De-Noised Combined Signal (Block 12)

The signals $X_n(k,l)$ may be combined with one another by a simple prefiltering technique of delay and sum type beamforming that is applied to obtain a partially de-noised combined signal X(k,l):

$$X(k, l) = \frac{1}{N} \sum_{n \in [1,N]} \overline{d_n(k)} . X_n(k, l)$$

Specifically, it should be observed that since the number of microphones is limited, this processing achieves only a small improvement in the signal/noise ratio, of the order of only 1 decibel (dB).

When the system under consideration has two microphones of right bisector that intersects the source, the angle $\theta_S$ is zero and the processing comprises mere averaging from the two microphones.

Estimating the Pseudo-Steady Noise (Block 14)

The purpose of this step is to calculate an estimate of the pseudo-steady noise component $\hat{V}(k,l)$ that is present in the signal X(k,l).

Very many publications exist on this topic, given that estimating and reducing pseudo-steady noise is a well-known problem that is quite well resolved. Various methods are effective and usable for obtaining $\hat{V}(k,l)$, in particular an algorithm for estimating the energy of the pseudo-steady noise by minima control recursive averaging (MCRA), such as that described by I. Cohen and B. Berdugo in *Noise estimation by minima controlled recursive averaging for robust*

*speech enhancement*, IEEE Signal Processing Letters, Vol. 9, No. 1, pp. 12-15, January 2002.

Calculating the Probability of Transients being Present (Block 16)

The term "transients" covers all non-steady signals, including both the useful speech and sporadic non-steady noise, that may present energy that is equivalent or sometimes greater than that of the useful speech (a vehicle going past, a siren, a horn, speech from other people, etc.).

It is possible to detect these transients with the help of the previously established estimate of the pseudo-steady noise component $\hat{V}(k,l)$ by subtracting that estimate from the overall signal X(k,l).

The detailed description below of blocks 18 and 20 explains how it is possible to discriminate amongst these transients between those that correspond to useful speech and those that correspond to non-steady noise and that have characteristics that are similar to useful speech.

The processing performed by the block 16 consists solely in calculating a probably $p_{Transient}(k,l)$ that transient signals are present, without making any distinction between useful speech and non-steady unwanted noise. The algorithm is as follows:

For each frame l and for each frequency band k, (i) Calculate the transient to steady ratio:

$$TSR(k, l) = \frac{X(k, l) - \hat{V}(k, l)}{\hat{V}(k, l)}$$

(ii) If $TSR(k,l) \leqq TSR_{min}$:

$$p_{Transient}(k,l)=0$$

(iii) If $TSR(k,l) \geqq TSR_{max}$:

$$p_{Transient}(k,l)=1$$

(iv) If $TSR_{min} < TSR(k,l) < TSR_{max}$:

$$p_{Transient}(k, l) = \frac{TSR(k, l) - TSR_{min}}{TSR_{max} - TSR_{min}}$$

The constants $TSR_{min}$ and $TSR_{max}$ are selected to correspond to situations that are typical, being close to reality.

Calculating the Arrival Directions of Transients (Block 18)

This calculation takes advantage of the fact that, unlike the pseudo-steady component of noise that is diffuse, transients are often directional, i.e. they come from a point sound source (such as the mouth of the speaker or the useful speech, or the engine of a motorcycle for lateral noise). It is therefore appropriate to calculate the arrival direction of such signals, which direction is generally well defined, and to compare this arrival direction with the angle $\theta_s$, corresponding to the direction from which useful speech originates, so as to determine whether the non-steady signal under consideration is useful or unwanted, and thus discriminate between useful speech and non-steady noise.

The first step consists in estimating the arrival direction of the transient.

The method used here is based on making use of the probability $p_{Transient}(k,l)$ that transients are present as determined by the block 18 in the manner described above.

More precisely, three-dimensional space is subdivided into angular sectors, each corresponding to a direction that is defined by an angle $\theta_i$, $i \in [1,M]$ (e.g. M=19 for the following collection of angles {−90°, −80°, . . . , 0°, . . . +80°, +90°}). It should be observed that there is no connection between the number N of microphones and the number M of angles tested. For example, it is entirely possible to test ten angles (M=10) while using only one pair of microphones (N=2).

Each angle $\theta_i$ is tested to determine which is the closest to the arrival direction of the non-steady signal under investigation. To do this, each pair of microphones (n,m) is taken into consideration and a corresponding estimate of the arrival direction $P_{n,m}(\theta_i, k,l)$ is calculated, with the modulus thereof being at a maximum when the angle $\theta_i$ under test is the closest to the arrival direction of the transient.

By way of example, this estimator may rely on a cross-correlation calculation having the form:

$$P_{n,m}(\theta_i,k,l)=E(X_m(k,l)\cdot\overline{X}_n(k,l)\cdot e^{-i2\pi f k \tau_i}),$$

with $$\tau_i = \frac{l_{n,m}}{c}\sin\theta_i$$

$l_{n,m}$ being the distance between the microphones of indices n and m; and c being the speed of sound.

A conventional first method consists in estimating the arrival direction as the angle that maximizes the modulus of this estimator, i.e.:

$$\hat{\theta}_{std}(k, l) = \underset{\theta_i,\ i \in [1,M]}{\operatorname{argmax}} \|P_{n,m}(\theta, k, l)\|$$

Another method, that is preferably used here, consists in weighting the estimator $P_{n,m}(\theta_i,k,l)$ by the probability $p_{Transient}(k,l)$ of the presence of transients and in defining a new decision strategy. The corresponding arrival direction estimator is then:

$$P_{New_{n,m}}(\theta_j,k,l)=P_{n,m}(\theta_j,k,l)\times p_{Transient}(k,l)$$

The estimator may be averaged over the pairs of microphones (n,m):

$$P_{New}(\theta_i, k, l) = \frac{1}{N(N-1)}\sum_{n \neq m} P_{New_{n,m}}(\theta_i, k, l)$$

Integrating the probability of the presence of transients into the arrival direction estimator presents three major advantages:

- direction estimation is targeted on the non-steady portions of the signal (for which the probability $p_{Transient}(k,l)$ is close to 1), having a well-defined arrival direction, thereby making estimation well-founded;
- direction estimation is robust against diffuse noise (for which the probability $p_{Transient}(k,l)$ is close to zero), which usually disturbs estimating arrival direction; and
- the reliability of the estimator $P_{New_{n,m}}(\theta_i,k,l)$ enables a plurality of non-steady signals to be distinguished that correspond to different directions and that are present simultaneously (it is seen below that this distinction may be by frequency band or by analyzing local analog maxima in the same frequency band). Thus, if a useful speech signal and a powerful lateral noise signal are present simultaneously, both types of signal are detected, thereby avoiding the useful speech signal that is also present being eliminated in error subsequently in the process, even if its energy is low.

There follows an explanation of the decision-making rules that make it possible on the basis of $P_{New}$:

either to deliver an estimate $\hat{\theta}(k,l)$ for the arrival direction of the transient;

or else to indicate that no arrival direction estimate can be delivered, in the event of the rules not being satisfied.

1) Significance of $P_{New}(\theta_{max},k,l)$ ($\theta_{max}$ being the angle that maximizes the value:

$$\|P_{New}(\theta_i,k,l)\|)$$

Rule 1:

A direction estimate can be supplied only if that $\|P_{New}(\theta_{max},k,l)\|$ exceeds a given threshold $P_{MIN}$.

This first rule serves to ensure over the portion (k,l) of the under consideration that the probability of a transient being present and the cross-correlation level are high enough for estimation to be well-founded.

2) $P_{New}$ monotonic over the range $[\theta_s-\theta_{max};\ \theta_{max}]$ (in order to avoid overloading the notation, the modulus bars for $P_{New}$ are omitted below).

Rule 2:

If $\theta_{max}$ lies outside the privileged cone, an angle estimate is confirmed only if $P_{New}$ is increasing monotonically over the range $[\theta_s-\theta_{max};\ \theta_{max}]$.

This second rule analyses the content of the "privileged cone", corresponding to the angular sector within which the source s is centered and that presents an angular extent of $\theta_0$. This privileged cone is defined by angles $\theta$ such that $|\theta-\theta_s|\leqq\theta_0$.

"Lateral" noise corresponds to a signal having an arrival direction that lies outside the privileged cone, and it is therefore considered that lateral noise is present if $|\theta_{max}-\theta_s|$ exceeds the threshold $\theta_0$.

To confirm this detection of lateral noise, it is necessary to verify that a useful speech signal is not simultaneously being input to the system.

To do this, $P_{New}(\theta_{max},k,l)$ is compared with the values of $P_{New}(\theta_i,k,l)$ as obtained for other angles, in particular those belonging to the privileged cone. This rule thus serves to ensure that there is no local maximum in the privileged cone.

3) Making lateral noise detection reliable

Rule 3:

If $\theta_{max}$ lies outside the privileged cone for the first occasion in the frame l under consideration, then an angle estimate is validated only if:

$$P_{New}(\theta_{max},k,l)\geqq\alpha_1\times P_{New}(\theta_{max},k,l-1)$$

and if:

$$P_{New}(\theta_{max},k,l)\geq\alpha_2\times\frac{1}{5}\sum_{i\in[l-5;l-1]}P_{New}(\theta_{max},k,i)$$

If lateral noise is detected, this third rule takes earlier frames into consideration in order to avoid false triggering. It is applied only to the first frame in which lateral noise is presumed, and it verifies that $P_{New}(\theta_{max},k,l)$ is significantly greater than the corresponding data obtained over the five preceding frames.

The parameters $\alpha_1$ and $\alpha_2$ are selected so as to correspond to situations that are difficult, i.e. close to reality.

If the above three Rules 1 to 3 are satisfied, the direction estimate $\hat{\theta}(k,l)$ is given by:

$$\hat{\theta}(k,l)=\theta_{max}$$

4) Stabilizing the detection of lateral noise

The last two rules serve to prevent interruptions in the detection of lateral noise. After a detection period, they continue to maintain this state over a time lapse referred to as the "hangover" time, even when the above decision rules are no longer satisfied. This makes it possible to detect possible low-energy periods in non-steady noise.

Rule 4:

If $\hat{\theta}(k,l-1)$ lies outside the privileged cone (for the preceding frame);

if $cpt_1\leqq HangoverTime_1$ (i.e. if the Hangover period has not terminated); and if $P_{New}(\hat{\theta}(k,l-1),k,l)$ is greater than a given threshold $P_1$, then the angle estimate is maintained and $cpt_1$ is incremented.

Rule 5:

If $\hat{\theta}(k,l-1)$ lies outside the privileged cone (for the preceding frame);

if $cpt_2\leqq HangoverTime_2$; and if $$\frac{1}{5}\sum_{i\in[l-5;l-1]}P_{New}(\hat{\theta}(k,l-1),k,i)$$

is greater than a given threshold $P_2$, then the angle estimate is maintained and $cpt_2$ is incremented.

If one of these last two rules (Rule No. 4 or Rule No. 5) is satisfied, it takes priority, giving the result $\hat{\theta}(k,l)=\hat{\theta}(k,l-1)$, thus with possible correction of the value of $\hat{\theta}(k,l)$ which is not made equal to $\theta_{max}$ but which is maintained at its preceding value.

To summarize, the calculation of $\hat{\theta}(k,l)$ follows three possible paths:

i) if Rule No. 4 or Rule No. 5 is satisfied, then $\hat{\theta}(k,l)=\hat{\theta}(k,l-1)$;

ii) otherwise (neither Rule No. 4 nor Rule No. 5 is satisfied), if Rules Nos. 1, 2, and 3 are satisfied, then $\hat{\theta}(k,l)=\theta_{max}$;

iii) else (neither Rule No. 4 nor Rule No. 5 is satisfied, and at least one of Rules Nos. 1, 2, and 3 is not satisfied), then $\hat{\theta}(k,l)$ is not defined.

In a variant, the estimate $P_{New}$ is averaged over packets of frequency bands $K_1, K_2, \ldots, k_p$:

$$P_{New}(\theta_i,K_j,l)=\frac{1}{N(N-1)}\frac{1}{C_j}\sum_{n\neq m}\left[\sum_{k\in K_j}P_{New_{n,m}}(\theta_i,k,l)\right]$$

$C_j$ designating the cardinal sine function of $K_j$.

Under such circumstances, estimation of the angle $\theta_{max}$ is not performed on each frequency band, but on each packet $K_j$ of frequency bands.

It should also be observed that a "full band" approach is possible (p=1, only one angle being implemented per frame).

Finally, it should be observed that the proposed method is compatible with using unidirectional microphones. Under such circumstances, it is common practice to use a linear array (microphones in alignment with their privileged directions being identical) oriented towards the speaker. Under such circumstances, the value of $\theta_S$ is thus naturally known and equal to zero.

Calculating the Probability of Speech being Present on a three-dimensional space criterion (block 20)

The following step, which is characteristic of the method of the invention, consists in calculating a probability for speech being present that is based on the estimated arrival direction $\hat{\theta}(k,l)$ obtained in the manner specified above.

This is a probability that is written $p_{spa}(k,l)$ and which is thus original in that it is calculated on the basis of a spatial criterion (from $\hat{\theta}(k,l)$, and so as to distinguish between non-steady signals forming part of useful speech and unwanted noise. This probability is subsequently used in a conventional de-noising structure (block 22, described below).

The probability $p_{spa}(k,l)$ may be calculated in various ways, giving a binary value, or indeed multiple values. Two examples of calculating $p_{spa}(k,l)$ are described below, it being understood that other relationships may be used for expressing $p_{spa}(k,l)$ on the basis of $\hat{\theta}(k,l)$.

1) Calculating a Binary Probability $p_{spa}(k,l)$

The probability of speech being present takes the values "0" or "1":

- it is set to "0" when lateral noise is detected, i.e. a transient coming from a direction outside the privileged cone; and
- it is set to "1" when the arrival direction of the transient lies within the privileged cone, or when it has not been possible to make a reliable estimate concerning said direction.

The corresponding algorithm is as follows:

If $\hat{\theta}(k,l)$ lies within the privileged cone ($|\hat{\theta}(k,l)-\theta_S|\leqq\theta_0$,
then $p_{spa}(k,l)=1$ If $\hat{\theta}(k,l)$ lies outside the privileged cone ($|\hat{\theta}(k,l)-\theta_S|\theta_0$),
then $p_{spa}(k,l)=0$ If $\hat{\theta}(k,l)$ is not defined,
then $p_{spa}(k,l)=1$ 2) Calculating a Probability for $p_{spa}(k,l)$ Having Continuous Values Over the Range [0,1]

It is possible to calculate $p_{spa}(k,l)$ progressively, e.g. using the following algorithm:

If $\hat{\theta}(k,l)$ lies within the privileged cone ($|\hat{\theta}(k,l)-\theta_s|\leqq\theta_0$)
then $p_{spa}(k,l)=1$ If $\hat{\theta}(k,l)$ lies outside the privileged cone ($|\hat{\theta}(k,l)-\theta_s|<\theta_0$)
then $$p_{spa}(k,l) = 1 - \frac{|\hat{\theta}(k,l) - \theta_0|}{\frac{\pi}{2} - \theta_0}$$

If $\hat{\theta}(k,l)$ is not defined,
then $p_{spa}(k,l)=1$

Reducing Lateral Noise (Block 22)

The probability $p_{spa}(k,l)$ that speech is present as calculated by the block 20, itself depending on the probability $p_{Transient}(k,l)$ that transients are present as calculated by the block 16, is used as an input parameter for a conventional de-noising technique.

It is known that the probability of speech being present is a crucial estimator in achieving good operation of a de-noising algorithm, since it underpins obtaining a good estimate of noise and calculating an effective optimum gain level.

It is advantageous to use a de-noising method of the optimally modified log-spectral amplitude (OM-LSA) type such as that described by I. Cohen, *Optimal speech enhancement under signal presence uncertainty using log-spectral amplitude estimator*, IEEE Signal Processing Letters, Vol. 9, No. 4, April 2002.

Essentially, the application of so-called "log-spectral amplitude" (LSA) gain serves to minimize the mean square distance between the logarithm of the amplitude of the estimated signal and the algorithm of the amplitude of the original speech signal. This second criterion is found to be better than the first since the selected distance is a better match with the behavior of the human ear, and thus gives results that are qualitatively superior. Under all circumstances, the essential idea is to reduce the energy of frequency components that are very noisy by applying low gain to them while leaving intact frequency components suffering little or no noise (by applying gain equal to 1 to them).

The OM-LSA algorithm improves the calculation of the LSA gain to be applied by weighting the conditional probability of speech being present.

In this method, the probability of speech being present is involved at two important moments, for estimating the noise energy and for calculating the final gain, and the probability $p_{spa}(k,l)$ is used on both of these occasions.

If the estimated power spectrum density of the noise is written $\hat{\lambda}_{Noise}(k,l)$, then this estimate is given by:

$$\hat{\lambda}_{Noise}(k,l)=\alpha_{Noise}(k,l)\cdot\hat{\lambda}_{Noise}(k,l-1)=[1-\alpha_{noise}(k,l)]\cdot|X(k,l|^2$$

with:

$$\alpha_{Noise}(k,l)=\alpha_B+(1-\alpha_B)\cdot p_{spa}(k,l)$$

It should be observed here that the probability $p_{spa}(k,l)$ modulates the forgetting factor in estimating noise, which is updated more quickly concerning the noisy signal $X(k,l)$ when the probability speech is low, with this mechanism completely conditioning the quality of $\hat{\lambda}_{Noise}(k,l)$.

The de-noising gain $G_{OM\text{-}LSA}(k,l)$ is given by:

$$G_{OM\text{-}LSA}(k,l)=\{G_{H1}(k,l)\}^{p_{spa}(k,l)}\cdot G_{min}{}^{1-p_{spa}(k,l)}$$

$G_{H1}(k,l)$ being the de-noising gain (which is calculated as a function of the noise estimate $\hat{\lambda}_{Noise}$) described in the above-mentioned article by Cohen; and $G_{min}$ being a constant corresponding to the de-noising applied when speech is considered as being absent.

It should be observed at this point that the probability $p_{spa}(k,l)$ plays a major role in determining the gain $G_{OM\text{-}LSA}(k,l)$. In particular, when this probability is zero, the gain equal to $G_{min}$ and maximum noise reduction min is applied: for example, if a value of 20 dB is selected for $G_{min}$, then previously detected non-steady noise is attenuated by 20 dB.

The de-noised signal $\hat{S}(k,l)$ output by the block 22 is given by:

$$\hat{S}(k,l)=G_{OM\text{-}LSA}(k,l)\cdot X(k,l)$$

It should be observed that such a de-noising structure usually produces a result that is unnatural and aggressive on non-steady noise, which is confused with useful speech. One of the major advantages of the present invention is that it is effective in eliminating such non-steady noise.

Furthermore, in the above expressions, it is possible to use a hybrid probability for the presence of speech $p_{hybrid}(k,l)$, i.e. a probability calculated on the basis of $p_{spa}(k,l)$ combined with some other probability for the presence of speech $p(k,l)$, e.g. calculated using the method described in WO 2007/099222 A1 (Parrot SA). This gives:

$$p_{hyprid}(k,l)=\min(p(k,l),p_{spa}(k,l))$$

This hybrid probability makes it possible to benefit from identifying non-steady noise associated with small values of $p_{spa}(k,l)$ and to improve the probability estimate $p_{hybrid}(k,l)$ for portions (k,l) where an arrival direction estimate $(\hat{\theta}(k,l)$ has not been defined (producing a probability $p_{spa}(k,l)$ that is forced to the value 1, by security).

The hybrid probability $p_{hybrid}(k,l)$ thus combines both non-steady noise detected by $p_{spa}(k,l)$ and other noise (e.g. pseudo-steady noise as detected by $p(k,l)$.

Reconstructing the Signal in the Time Domain (Block 24)

The last step consists in applying an inverse fast Fourier transform iFFT to the signal $\hat{S}(k,l)$ to obtain the de-noised speech signal $\hat{s}(t)$ in the time domain.

What is claimed is:

1. A method of de-noising a noisy sound signal picked up by a plurality of microphones of a multi-microphone audio device operating in noisy surroundings, in particular a "hands-free" telephone device for a motor vehicle, the noisy sound signal comprising a useful speech component coming from a directional speech source and an unwanted noise component, the noise component itself including a non-steady lateral noise component that is directional, the method comprising, in the frequency domain for a plurality of frequency bands defined for successive time frames of the signal, the following signal processing steps:

a) combining a plurality of signals picked up by the corresponding plurality of microphones to form a noisy combined signal;

b) from the noisy combined signal, estimating a pseudo-steady noise component contained in said noisy combined signal;

c) from the pseudo-steady noise component estimated in step b) and from the noisy combined signal, calculating a probability of transients being present in the noisy combined signal;

d) from the plurality of signals picked up by the corresponding plurality of microphones and from the probability of transients being present as calculated in step c), estimating a main arrival direction of transients;

e) from the main arrival direction of transients as estimated in step d), calculating a probability of speech being present on the basis of a three-dimensional spatial criterion suitable for distinguished amongst the transients between useful speech and lateral noise, comprising the following successive substeps:

d1) partitioning three-dimensional space into a plurality of angular sectors;

d2) for each sector, evaluating an arrival direction estimator from the plurality of signals picked up by the corresponding plurality of microphones;

d3) weighting each estimator by the probability of the presence of transients as calculated in step c);

d4) from the weighted estimator values calculated in step d3), estimating a main arrival direction of transients; and d5) confirming or infirming the estimated main arrival direction of transients performed in step d4); and f) from the probability of speech being present as calculated in step e), and from the noisy combined signal, selectively reducing noise by applying variable gain specific to each frequency band and to each time frame.

2. The method of claim 1, wherein the processing in step a) is prefiltering processing of the fixed beamforming type.

3. The method of claim 1, wherein, in step d5) the estimate is confirmed only if the value of the weighted estimate corresponding to the estimated direction is greater than a predetermined threshold.

4. The method of claim 1, wherein, in step d5), the estimate is confirmed only in the absence of a local maximum of the weighted estimator in the angular sector from which the useful speech signal originates.

5. The method of claim 1, wherein, in step d5), the estimate is confirmed only if the value of the estimator is increasing monotonically over a plurality of successive time frames.

6. The method of claim 1, further including a step of maintaining the estimate of the main arrival direction over a minimum predetermined lapse of time.

7. The method of claim 1, wherein the probability of speech being present as calculated in step e) is a probability that is binary, taking a value of 1 or 0 depending on whether the main transient arrival direction estimated in step d) is or is not situated in the angular sector from which the useful speech signal originates.

8. The method of claim 1, wherein the probability of speech being present as calculated in step e) is a probability having multiple values, being a function of the angular difference between the main arrival direction of transients as estimated in step d) and the direction from which the useful speech signal originates.

9. The method of claim 1, wherein the processing of step f) is selective noise reduction processing by applying gain of optimized modified log-spectral amplitude.

* * * * *